United States Patent [19]

Trepanier

[11] 4,397,044
[45] Aug. 9, 1983

[54] PROTECTIVE BONNET FOR BEEKEEPERS

[76] Inventor: Gaston Trepanier, 676 Rang Saint-Antoine, St. Sophie de Léyrard, County of Lothiniere, Canada, G0X 3C0

[21] Appl. No.: 279,662

[22] Filed: Jun. 29, 1981

[51] Int. Cl.³ .......................... A42B 3/00; A42B 5/00
[52] U.S. Cl. ................................................ 2/4; 2/207
[58] Field of Search ...................... 2/4, 202, 206, 207

[56] References Cited

U.S. PATENT DOCUMENTS 1,802,262  4/1931  Mahler ........................................ 2/4
2,189,892  2/1940  Fox ............................................. 2/4

FOREIGN PATENT DOCUMENTS 3268  10/1900  Austria ....................................... 2/4
173302  11/1915  Canada .
310311  4/1931  Canada .

Primary Examiner—Doris L. Troutman

[57] ABSTRACT

A protection veil to protect the head and the neck down to the bust of a user such as an apiarist, against stinging on those parts of the body. This veil is characterized by a lower portion that covers the bust, by a construction with flexible and non-metallic woven fabric that easily fits the outline of the bust and of the hat on which it is carried, and that allows its compact folding. This veil also includes a window of transparent plastic that is removably secured by a self-adhesive such as VELCRO, and also elastic bands that hold the veil around the bust, including the shoulders and around the hat.

1 Claim, 4 Drawing Figures

U.S. Patent  Aug. 9, 1983  4,397,044
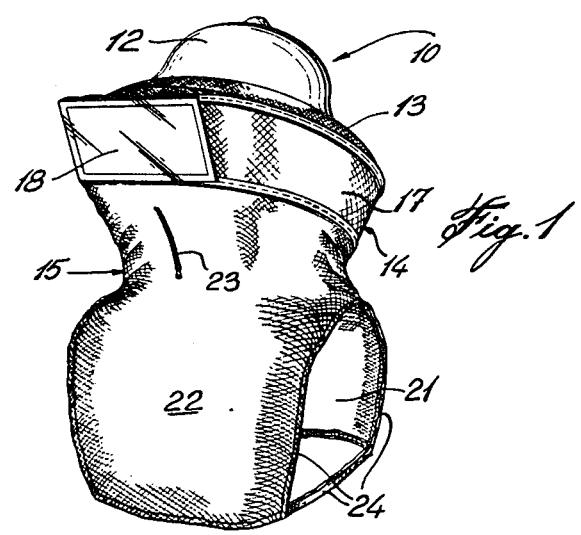
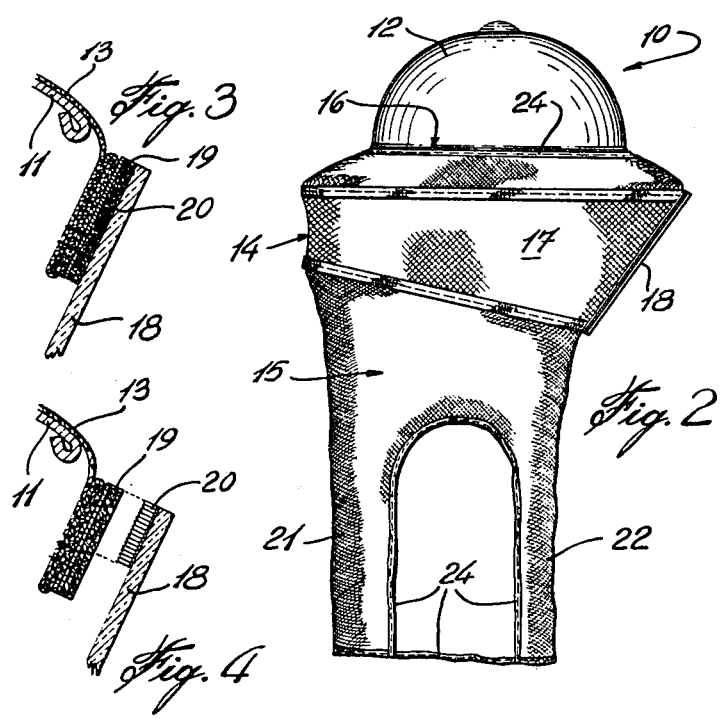

PROTECTIVE BONNET FOR BEEKEEPERS

This invention relates to a protection veil of the type known in particular to be used by an apiarist to protect himself against stinging.

The protection veils of the above type that have been proposed so far are characterized by a lower portion that extends down only to the lower end of the neck and by a construction including a metal portion, either a frame or a portion of metallic screen. Those protection veils do not allow a tight and comfortable fitting and are found of disadvantageous construction for compact storage and simple manufacturing.

It is a general object of the present invention to provide a protection veil of the above type that is adapted to tightly cover the whole upper portion of a user including the head, neck and bust.

It is another general object of the present invention to provide a protection veil of the above type that compactly folds to be carried in one's pocket and that is easy and economical to manufacture.

It is another object of the present invention to provide a protection veil of the above type that includes a window that is easily put in place and removable for replacement when it becomes cracked, scratched or otherwise damaged.

It is a more specific object of the present invention to provide a protection veil of the above type that is entirely made of a flexible woven fabric to easily fit around the outline of the bust of the user and around the flanged hat on which it is carried.

It is another object of the present invention to provide a protection veil of the above type that attaches on the peripheral edge of a flanged hat and around the bust of the user such as to produce sufficient free space around the face of the user to allow good ventilation and breathing in particular in hot and damp weather.

The veil of the present invention includes a lower portion that covers the bust, manufactured with woven fabric that is flexible and non-metallic to well fit the outline of the bust and of the hat on which it rests and that allows its compact folding. This veil also includes a window of transparent plastic that is removably secured or attached by a self-adhesive such as VELCRO, and also elastic bands that hold the veil well against the bust, including the shoulders and around the hat.

Other objects and advantages of the present invention will be better understood with reference to the following detailed description of a preferred embodiment thereof which is illustrated, by way of example, in the accompanying drawing; in which:

FIG. 1 is a perspective view of a protection veil according to the present invention;

FIG. 2 is a side elevation view of the same protection veil; and

FIGS. 3 and 4 are cross sectional views in elevation of the upper edge of a plastic window forming part of the protection veil; and shown in attached and detached positions respectively.

The illustrated protection veil is adapted for use with a flanged hat in particular such as the hat 10 of the colonial or safari type. Such hat includes a peripheral edge or flange 11 and a central boss or crown 12 surrounded by the flange 11.

The illustrated protection veil comprises an annular upper portion 13, an annular intermediate portion 14 and a lower portion 15.

Those portions 13, 14 and 15 are entirely made of woven fabric of non-metallic screen and are highly flexible and easily foldable.

The annular upper portion 13 is dimensionally co-extensive with the flange 11 to cover the same. The upper portion 13 defines a central aperture at 16 that allows passage of the crown of the hat when that upper portion is rested on the flange 11. The outside edge of the upper portion 13 is sewn to the upper edge of the band 17 that is part of the intermediate portion 14 which is of generally inverted frusto-conical shape.

This portion 14 includes a window formed of a plate or sheet of transparent plastic 18 in addition to the band 17 of screen material. The band 17 includes a narrower rear area and decreases in width from a wider front area to the narrower rear area. The opposite ends of the band 17 that are in front are thus wider and are cut at an angle to form an acute angle of about 70° at the top and an obtuse angle of about 110° at the bottom. This allows to install the window 18 with an inclination, as shown. Thus, the window 18 is inclined so as to face downwardly and is positioned at the height of the eyes of the user and in alignment with the eyes. The window 18 is fixed to the woven fabric or screen by a self-adhesive strip, in particular of VELCRO, as shown by the complementary elements 19 and 20 typical of the VELCRO strip. The latter extends co-extensive with the peripheral edge of the window of plastic to form a tight joint or connection all around the window.

The lower portion 15 is sewn at its top edge to the lower edge of band 17 and tubularly extends downward at the height of the face and of the neck to project downward to cover the wearer's bust by a back flap 21 and a front flap 22 which form arm holes between them. A zipper 23 is fixed in the lower portion 15 at the height of the nose and of the mouth to allow access inside the veil and thus to the face.

Elastic bands 24 are fixed along the edge of the arm holes, along the lower free edge of the flaps and between the flaps 21 and 22, and around the central aperture 16 to tighten the veil around the shoulders, against the bust and around the crown 12.

I claim:

1. A protection veil adapted for use with a hat of the type having a central crown portion surrounded by a peripheral flange, said veil comprising an annular upper portion adapted to engage onto the peripheral flange of the hat, an intermediate portion adapted to depend downwardly from said peripheral flange all around the same, and a lower portion depending from said intermediate portion, said upper portion defining a central aperture to allow passage of said crown portion, a first tightening means provided all around said central aperture to tighten said upper portion against said crown portion, said intermediate portion having an inverted frusto-conical shape with its larger diameter base edge attached to the radially outer edge of said top portion and its smaller diameter base edge attached to the top edge of said lower portion, said intermediate portion defining a window opening at the front of the veil adapted to be aligned with the eyes of the wearer, said intermediate portion consisting of a band, the ends of which are disposed at the front of said veil and define the sides of said window opening, said band being widest at said ends and narrowest at its central portion which is located at the back of said veil, a transparent plastic panel removably closing said window opening, a self-adhesive strip removably securing the edges of said panel to the edges of said window opening, said plastic panel facing downwardly, said lower portion adapted to cover the neck and the bust of the wearer and including a front flap and a rear flap defining arm-holes therebetween, second tightening means provided all along the edges of said arm-holes and all along the bottom edges of said front and rear flaps and across said arm-holes, said lower portion having an opening closable by a slide fastener located below said window opening in the mouth area of said wearer said veil being made of a non-metallic and flexible screen material.

* * * * *